(12) United States Patent
Aredes et al.

(10) Patent No.: US 12,051,904 B2
(45) Date of Patent: Jul. 30, 2024

(54) SYSTEM AND METHOD FOR SMOOTHING PHOTOVOLTAIC GENERATION INTERMITTENCY

(71) Applicants: Petróleo Brasileiro S.A.-Petrobras, Rio de Janeiro (BR); UNIVERSIDADE FEDERAL DO RIO DE JANEIRO—UFRJ, Rio de Janeiro (BR)

(72) Inventors: Mauricio Aredes, Rio de Janeiro (BR); Luís Guilherme Barbosa Rolim, Rio de Janeiro (BR); Leonardo Francisco Da Silva, Rio de Janeiro (BR); Gustavo Figueiredo Gontijo, Rio de Janeiro (BR); Bruno Wanderley França, Rio de Janeiro (BR); Thiago Cardoso Tricarico, Rio de Janeiro (BR); Marcello Da Silva Neves, Rio de Janeiro (BR); André Ramos De Castro, Rio de Janeiro (BR); Rodrigo Guido Araujo, Rio de Janeiro (BR)

(73) Assignee: Petróleo Brasileiro S.A.—Petrobras (BR)

( * ) Notice: Subject to any disclaimer, the term of this patent is extended or adjusted under 35 U.S.C. 154(b) by 28 days.

(21) Appl. No.: 18/087,199

(22) Filed: Dec. 22, 2022

(65) Prior Publication Data
US 2023/0208143 A1    Jun. 29, 2023

(30) Foreign Application Priority Data

Dec. 23, 2021    (BR) .................. 10 2021 026269 9

(51) Int. Cl.
*H02J 3/32* (2006.01)
*H02J 3/38* (2006.01)
*H02J 7/00* (2006.01)

(52) U.S. Cl.
CPC ............... *H02J 3/32* (2013.01); *H02J 3/381* (2013.01); *H02J 7/0047* (2013.01); *H02J 7/00712* (2020.01); *H02J 2300/26* (2020.01)

(58) Field of Classification Search
CPC .. H02J 3/32; H02J 7/00712; H02J 3/38; H02J 3/381; H02J 7/0047; H02J 2300/26
See application file for complete search history.

(56) References Cited

FOREIGN PATENT DOCUMENTS

| CN | 205986757 U | 2/2017 |
| CN | 110083107 A | 8/2019 |
| CN | 110380439 A | 10/2019 |

*Primary Examiner* — Robert L Deberadinis
(74) *Attorney, Agent, or Firm* — Mintz, Levin, Cohn, Ferris, Glovsky and Popeo, P.C.

(57) ABSTRACT

The present invention provides a system and method for smoothing photovoltaic power generation. Photovoltaic power plants have the inherent problem of generation intermittency caused by the variation in weather conditions over a period of seconds, minutes, and hours. This intermittency results in a variability of active power injection into the electrical grid by the photovoltaic power plant.

25 Claims, 5 Drawing Sheets

SYSTEM AND METHOD FOR SMOOTHING PHOTOVOLTAIC GENERATION INTERMITTENCY

CROSS-REFERENCE TO RELATED APPLICATION

This application claims priority to Brazilian Application No. BR 10 2021 026269 9, filed on Dec. 23, 2021, and entitled "SYSTEM AND METHOD FOR SMOOTHING PHOTOVOLTAIC GENERATION INTERMITTENCY," the disclosure of which is incorporated herein by reference in its entirety.

FIELD OF THE INVENTION

The present invention is related to the field of electrical energy generation, more specifically to the generation of renewable electrical energy through photovoltaic power plants.

DESCRIPTION OF THE STATE OF THE ART

Photovoltaic power plants have the inherent problem of generation intermittency caused by the variation in weather conditions over a period of seconds, minutes, and hours. This intermittency results in a variability of active power injection into the electrical grid by the photovoltaic power plant. This variability has the potential to cause disturbances, instabilities, and power quality problems in the electrical grid. Additionally, the converters of a photovoltaic power plant have their capacity underused, as they must be designed for the plant peak power.

For pre-existing photovoltaic power plants, the solution for adding an energy storage system for generation smoothing is a system that connects to the AC bus independently of the photovoltaic arrays, thus injecting its power entirely through this connection. It means, for example, that a solution based on a battery bank and a three-phase DC-AC converter will need this converter to be able to inject all the power demanded from the battery bank into its AC connection point.

Document CN 110380439-A discloses a marine photovoltaic grid-connected energy management device based on capacitor energy storage to reduce the impact of intermittent photovoltaic power generation system on the ship's power grid. The device has a photovoltaic cell, a photovoltaic controller, a photovoltaic inverter, a capacitor, and a bidirectional DC/DC converter. The photovoltaic cell converts solar energy into DC power through the photovoltaic controller for maximum tracking power. The system collects the operational parameters from the capacitor through the CAN bus communication and accepts commands from the bidirectional DC/DC converter to control the capacitor charging and discharging. The photovoltaic inverter converts the DC power from the DC bus into AC power and then connects to the ship's power grid. Document CN 110380439-A uses a capacitor to solve the technical problem in question.

Document CN110083107A discloses a microgrid intelligent central strategic control system and method.

The system has the following components:
a power supply module, connected to a central control module for power supply operation using a distributed power supply;
a central control module, connected to a supply module, a load monitoring module, a capacity calculation module, an optimization module, a distribution module, a load recovery module and a display module, for controlling the normal operation of each module by means of a microcontroller;
a load monitoring module, connected to the central control module, for detecting microgrid load data information by means of a monitoring program;
a capacity calculation module, connected to the central control module, for calculating the capacity of the backup microgrid by means of a calculation program;
an optimization module, connected to the central control module, for optimizing the management of the microgrid by means of an optimization procedure;
a distribution module, connected to the central control module, for power distribution operation of the microgrid through the distributor;
a load recovery module, connected to the central control module, for recovering the microgrid load;
a display module, connected to the central control module, for displaying load information from the monitored microgrid and fault information through a display;
a fault signal acquisition module, connected to the central control module, for detecting fault information of the distribution equipment in the microgrid, and transmitting it to the central control module, which controls whether power supply is powered off or not at the fault and displays the fault through a display module;
an energy storage module, connected to the central control module and controlled by the central control module, for storing electrical energy during idle time and for using it as an emergency power supply during special periods.

Document CN205986757-U discloses a field construction photovoltaic energy storage system.

The system has the following components:
a thin-film photovoltaic subassembly;
a compressed air energy storage system.
The compressed air energy storage system includes:
DC/AC converter;
compressor;
gas holder;
expander.

The thin-film photovoltaic sub-assembly passes through the external construction power consumption apparatus of a rectifier through one end of the first switch access of the DC/AC converter, the other end of the DC/AC converter, and the gas holder passes through the choke valve and inserts the expander, and the expander passes through the power consumption apparatus of external construction of the rectifier.

Given the difficulties found in the state of the art mentioned above, there is no effective solution that solves the intermittent injection of active power into the electrical grid by the photovoltaic power plant. The state of the art mentioned above lacks the unique characteristics that will be detailed below.

OBJECTIVE OF THE INVENTION

The objective is to provide a system and method for reducing or eliminating the variability of active power injection into the electrical grid caused by the variation in weather conditions in the photovoltaic power plant.

A second objective is to avoid that the converters of a photovoltaic power plant have their capacity underused, as they must be designed for the plant peak power.

BRIEF DESCRIPTION OF THE INVENTION

The present invention proposes a control system and method for controlling the variability of active power injection into the electrical grid, in order to avoid disturbances, instabilities and power quality problems in the electrical grid caused by the photovoltaic power plant. Additionally, the system and method prevent the converters of a photovoltaic power plant from having their capacity underused.

The invention relates to photovoltaic power plants to which an energy storage system is intended to be added to mitigate photovoltaic generation intermittency over a period of less than 1 day. The DC link terminals of the photovoltaic array should be made available for connection to the storage system.

System for smoothing photovoltaic power generation characterized by comprising secondary converter (1), battery bank (2), photovoltaic array (3), primary converter (4) and instrumentation system (5).

The method is characterized by comprising the secondary converter (1) operating in a four-layer cascaded control:
the first control layer is responsible for controlling the AC currents of the secondary converter;
the second control layer is responsible for regulating the DC link voltage of the secondary converter;
the third control layer controls the battery bank current by providing a reference DC voltage to the second layer;
the fourth control layer is responsible for generating the reference battery bank current by considering the power ramp.

BRIEF DESCRIPTION OF THE DRAWINGS

The present invention will be described in more detail below, with reference to the attached figures which, in a schematic way and not limiting the inventive scope, represent examples of its embodiment. The drawings are as follows.

DETAILED DESCRIPTION OF THE INVENTION

A detailed description of a preferred embodiment of the present invention follows below, which is exemplary and in no way limiting. It will nevertheless be clear to a person skilled in the art, upon reading this description, possible further embodiments of the present invention still consisting of the essential and optional features below.

The invention allows the use of preexisting power circuits for connecting a new energy storage system, reducing the necessary power of the new power electronic converter used to connect the energy storage system and potentially reducing the costs of this new system. The proposed solution, which consists of an innovative topology, allows the power injected into the grid not to suffer from sudden variations caused by the photovoltaic generation intermittency.

Additionally, this solution reduces the idle capacity of the existing converters in the photovoltaic power plant. The power that should flow through the battery bank is divided between the pre-existing and the new converters dedicated to the control of the storage system. That means the use of idle capacity while reducing the power demanded from new converters. The storage system avoids disturbing the maximum power extraction point tracking of the photovoltaic power plant by adjusting its battery bank reference power calculation step. The step is determined to be longer than the operating step of maximum power extraction point tracking, thus enabling this system to settle after each iteration of the reference battery power calculation.

Figure 1:
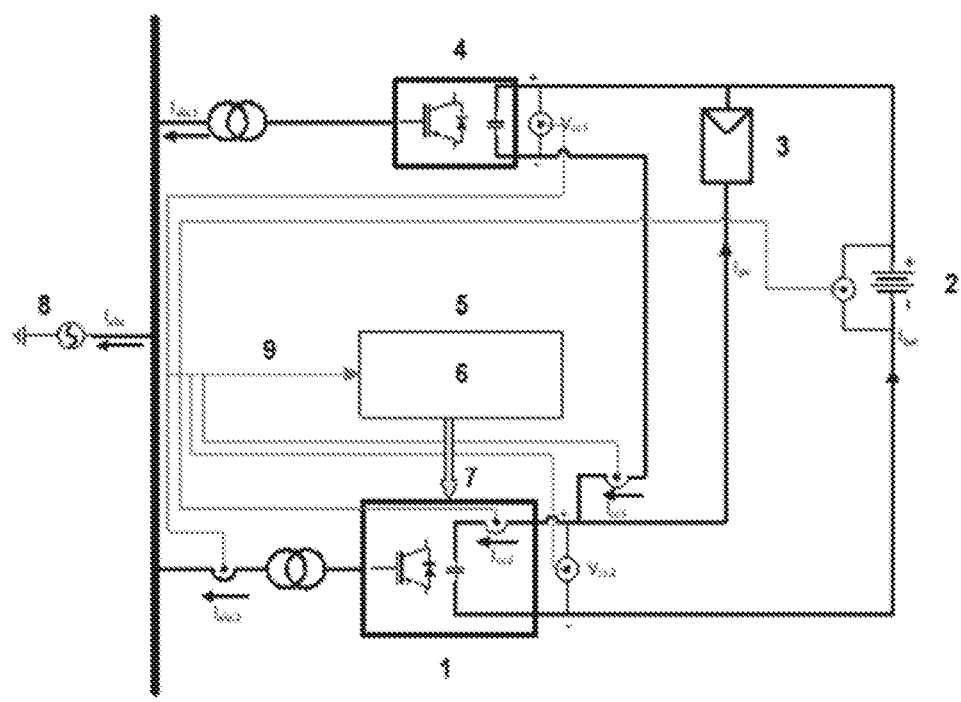
FIG. 1 illustrates the photovoltaic power plant storage system in order to reduce the operating power of the power electronic converter of the storage system and its components, being represented by: secondary converter (1), battery bank (2), photovoltaic array (3), primary converter (4), instrumentation system (5), microcontroller (6), electronic converter trigger drivers (7), external power network or grid (8) and measurements (9).

The invention is characterized by a system, shown in FIG. 1, which connects the storage system to the photovoltaic power plant in order to reduce the operating power of the power electronic converter of the storage system. The system for smoothing photovoltaic power generation comprises secondary converter (1), battery bank (2), photovoltaic array (3), primary converter (4) and instrumentation system (5). The components of this system connect to each other, as follows:
1. DC-side terminals of the converter (4) of the photovoltaic power plant connect to the terminals of the photovoltaic array (3) (FIG. 1).
2. The DC-side positive terminal of the converter (1) of the storage system (2) connects to the DC-side negative terminal of the converter (4) of the photovoltaic power plant. The DC-side negative terminal of the converter (1) of the storage system connects to the negative terminal of the battery bank (2) (FIG. 1).
3. The positive terminal of the battery bank (2) is connected to the DC-side positive terminal of the photovoltaic system (3), being at the same electric point/phase of the positive terminal of the converter (4) of the photovoltaic power plant and the positive terminal of the photovoltaic array (3) (FIG. 1).

4. In this configuration, the DC link of the photovoltaic power plant (3) is connected in series with the DC link of the secondary converter (1). Thus, the sum of these voltages is equal to the voltage at the battery bank terminals (2) (FIG. 1).

Both the converter (1) of the storage system and the converter (4) of the photovoltaic power plant are connected to the AC side of the system, that is, the electrical grid, through independent filters, which may use or not transformers to adjust the AC voltage levels. (FIG. 1).

These interconnections result in a system wherein the ratio of the secondary converter power to the battery bank power equals to the ratio of the secondary converter DC voltage to the battery bank DC voltage. The system shown in FIG. 1 is therefore a solution that reduces the power of the storage system converter in relation to the battery bank power.

The secondary converter also has a DC contactor to automatically connect or disconnect it from the DC side of the system.

During system operation, the primary converter controller is responsible for imposing the DC voltage of the photovoltaic array, in order to extract its maximum available power. This is a pre-existing functionality of a photovoltaic power plant.

The power variation of the photovoltaic array throughout the day causes fluctuations in the power injected into the electrical grid, that is, on the AC side of the system.

The smoothing of these power fluctuations throughout the day is performed by the secondary converter, which controls the battery bank power by controlling the voltage of its DC terminals.

Figure 2:
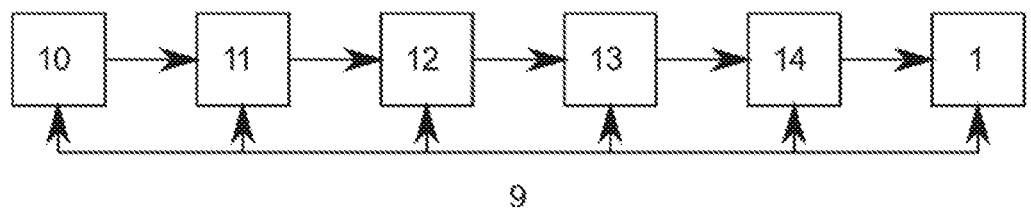
FIG. 2 illustrates the block diagram of the cascade control of the secondary converter (1) and its components, represented by: ramp power control (10), battery current control (11), DC voltage control (12), AC current control (13), modulator (14), secondary converter (1) and measurements (9).

The secondary converter operates with a four-layer cascaded control, as shown in the secondary converter control block diagram in FIG. 2.

Figure 3:
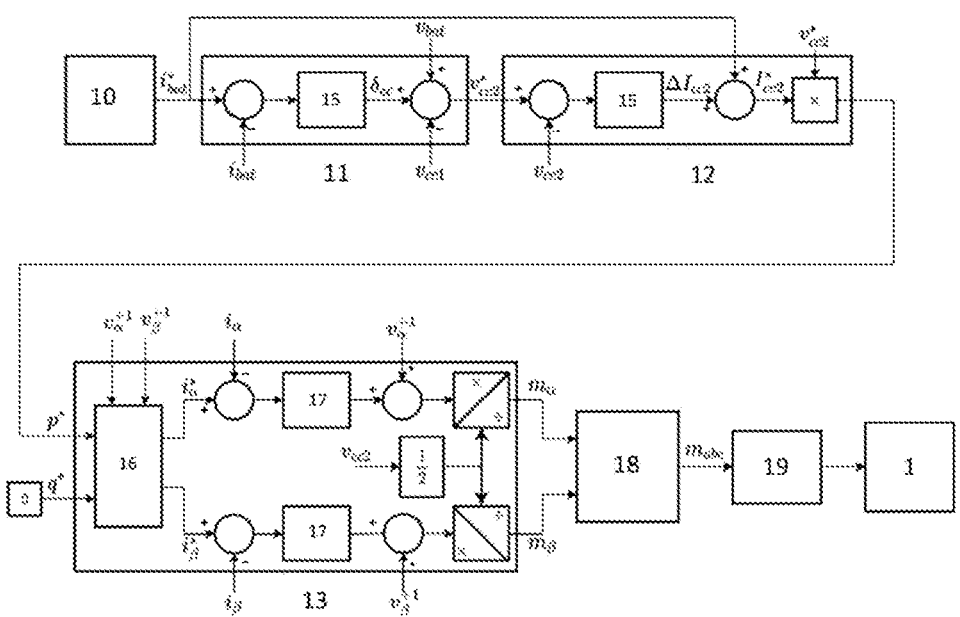
FIG. 3 illustrates a view of the exploded block diagram of the secondary converter control and its components, represented by: ramp power control (10), battery current control (11), proportional integral controller—PI (15), DC voltage control (12), pq theory (16), proportional resonant controller—PR (17), AC current control (13), inverse Clarke transformation (18), PWM modulator (19) and secondary converter (1).

The first, innermost layer is responsible for controlling the AC currents of the secondary converter, given the reference active power provided by the second control layer, which is responsible for regulating the DC link voltage of the secondary converter (FIG. 3). That is, the active power flowing through the converter is dependent on the DC voltage control, which absorbs or injects power depending on the reference DC voltage.

The third layer controls the battery bank current, providing a reference DC voltage to the second layer, as shown in FIG. 3. In other words, the battery bank current controller modifies the reference DC voltage to change the current flowing from the storage system to the DC link of the secondary converter. This is topologically possible since, when changing the DC voltage level, the internal voltage drop of the storage system is also altered, thus causing the circulation of DC current on the internal resistance of the battery bank.

Figure 4:
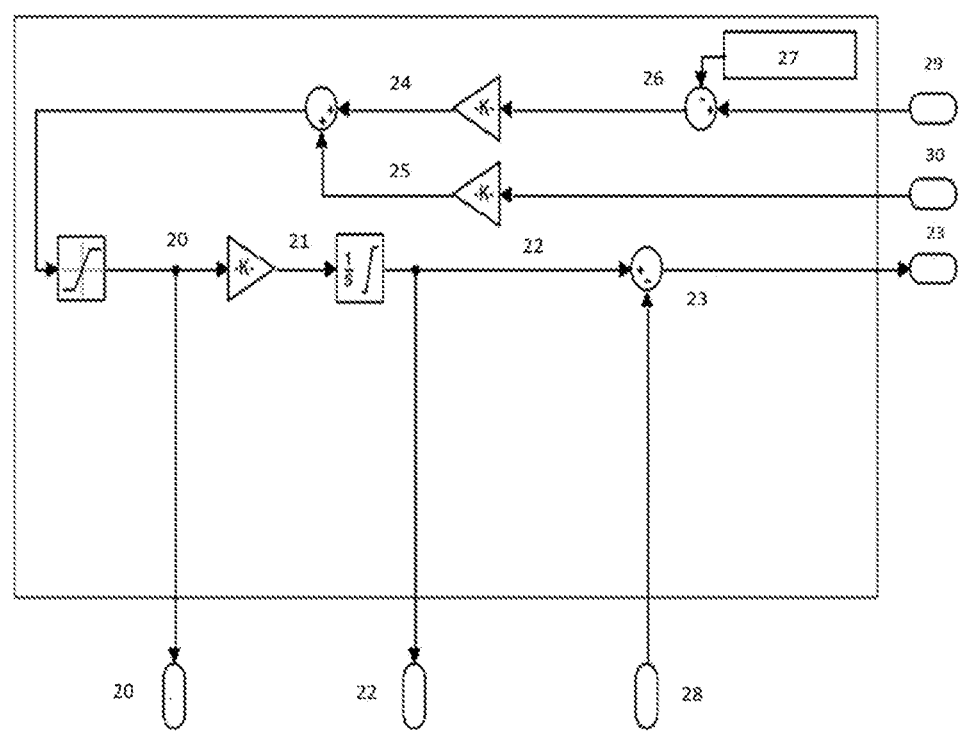
FIG. 4 illustrates the power ramp control and its components represented by: normalized and limited grid power rate of change (20), grid power rate of change (21), grid's reference power output (22), reference battery bank power (23), error in the normalized battery bank state-of-charge (24), normalized battery bank power (25), variation in the battery bank state-of-charge (26), reference of the battery bank state-of-charge (27), photovoltaic system power (28), battery bank state-of-charge (29) and battery bank power (30).

The fourth, outermost control layer is the one that generates the reference battery bank current, as shown in FIG. 4. At a lower frequency than the rest of the control system, the reference power injected into the grid and from the battery bank and a corresponding disturbance power on the primary converter (product between battery bank current and primary converter DC-link voltage) are calculated in order to meet the criterion of maximum rate of change of the active power injected into the grid. The reference battery bank power is calculated as the measured bank-supplied power plus the difference between the reference power injected into the grid and the measured grid injected power ($P_{batref}=P_{bat}+P_{gref}-P_g$ or, ignoring losses, $P_{batref}=P_{gref}-P_{pv}$, wherein $P_{pv}$ is the power injected by the array). The reference power injected into the grid is calculated in such a way as to guarantee a maximum rate of change: as the integral of a rate of change TV(t), which is limited in absolute value by the value desired by the operator, i.e., $\pm TV_{max}$. The rate of change is calculated as a linear combination between the current power supplied by the battery bank and its deviation from the reference state of charge but limited by the maximum rate of change value of the grid power. FIG. 4 shows, in a diagram, the generation of the reference battery power.

Figure 5:
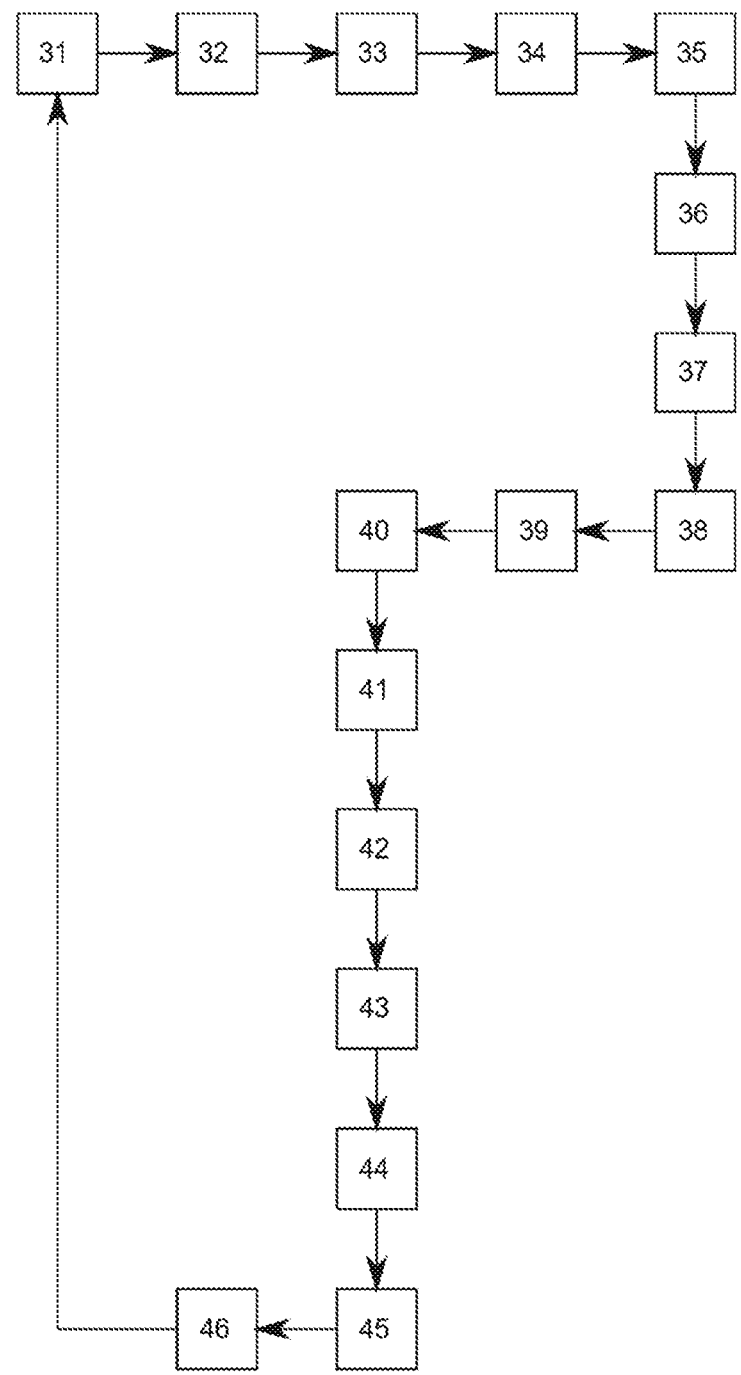
FIG. 5 illustrates the sequence diagram of the power ramp control and its components, being represented by: controller (31), function which calculates the reference current (32), reference current (33), function which calculates the reference power (34), grid power variation limiter (35), calculates the limited rate of change of the grid's reference power (36), integrates the limited rate of change of the grid's reference power (37), calculates the reference battery bank power (38), reference battery bank power (39), limits the battery bank power (40), calculates the corresponding battery bank current (41), records disturbance on the corresponding primary converter (42), calculates constant disturbance current on the primary converter (43), calculates and limits the battery bank power (44), calculates the battery bank current (45), reference battery bank current (46). Ramp control sample rate=once per second.

The frequency for calculating the reference power injected into the grid must be lower than that of the maximum power point tracking (MPPT) system of the primary converter. In the other control calculation cycles, those that do not correspond to the calculation of a new reference power injected into the grid, the reference battery bank current to be supplied to the third control layer is calculated in order to keep constant the disturbance power on the primary converter. This allows the MPPT to remain at the correct point of maximum power extraction from the photovoltaic array. The current is therefore calculated as $I_{bat}=P_{dis}/V_{dc1}$, wherein the variables mean battery bank current, disturbance power on the primary converter and DC link voltage of the primary converter, respectively. The calculation logic of the fourth layer is shown as a sequence diagram in FIG. 5.

The operation of the four control layers of the secondary converter is divided into two equipment operating modes. In the first, only layers one and two are activated (AC current control and DC voltage control shown in FIG. 2), with the objective of smoothly loading the DC link of the secondary converter at a given voltage level by the difference between the DC voltages of the storage system and the photovoltaic array. After this first equipment initialization phase, when the DC voltage reaches the reference point, the secondary converter control activates the DC contactor, closing the circuit on the DC side of the system, electrically connecting the storage system and the photovoltaic power plant to the secondary converter. From then on, the equipment starts operating with the four control layers, making small variations around the operating point, that is, around the DC voltage of the secondary converter, allowing a smoothly and safely control of the storage system power.

The solution is, therefore, a combination between the system described in FIG. 1 and a method that has the control strategy shown in FIGS. 2, 3, 4 and 5, which allows smoothing the power fluctuations of the photovoltaic power plant, using a converter with a power lower than the power of the storage system.

Example

The invention successfully applied the system and method through a functional prototype having the elements of FIG. 1. In the case of the built prototype, the MPPT operates at 6.8 Hz, while these powers are calculated at 1 Hz. The prototype smooths the generation of a 35-kW photovoltaic power plant using a 35 kW Li-ion battery bank and an additional 24 kW three-phase converter. Thus, the proposed invention was confirmed by the use of the prototype, which made it possible to smooth the power fluctuations of the photovoltaic power plant, using a converter with a power lower than the power of the storage system. In addition, it was also demonstrated that the system and method prevented the photovoltaic power plant converters from having their capacity underused.

The invention claimed is:

1. A system for smoothing photovoltaic generation intermittency characterized in that it comprises secondary converter, battery bank, photovoltaic array, primary converter, instrumentation system, microcontroller, drivers, external electrical network or grid, and measurements.

2. The system, according to claim 1, wherein a DC-side terminals of a photovoltaic power plant converter is connected to terminals of the photovoltaic array.

3. The system, according to claim 2, wherein a DC-side positive terminal of a storage system converter connects to a DC-side negative terminal of the photovoltaic power plant converter.

4. The system, according to claim 3, wherein the DC-side negative terminal of a storage system converter connects to a negative terminal of the battery bank.

5. The system, according to claim 4, wherein a positive terminal of the battery bank is connected to the DC-side positive terminal of the photovoltaic system, being at the same electric point of the positive terminal of the photovoltaic power plant converter and the positive terminal of the photovoltaic array.

6. The system, according to claim 5, wherein the DC link of the photovoltaic power plant is connected in series with the DC link of the secondary converter.

7. The system, according to claim 6, wherein both the storage system converter and the photovoltaic power plant converter are connected to an AC side of the electrical grid through independent filters.

8. The system, according to claim 7, wherein both the storage system converter and the photovoltaic power plant converter may use or not transformers to adjust AC voltage levels.

9. The system, according to claim 1, wherein the secondary converter also has a DC contactor, to automatically connect or disconnect it from a DC side of the system.

10. The system, according to claim 1, wherein the primary converter controller, during system operation, is responsible for imposing a DC voltage of the photovoltaic array to extract its maximum available power.

11. The system, according to claim 1, wherein the secondary converter controls a battery bank power by controlling a voltage of its DC terminals.

12. A method for smoothing photovoltaic generation intermittency, wherein the method comprises:
operating a secondary converter in a four-layer cascaded control;
controlling AC currents of the secondary converter by a first control layer;
regulating a DC link voltage of the secondary converter by a second control layer;
controlling a battery bank current by a third control layer; and
generating a reference battery bank current, by a fourth control layer, by considering a power ramp.

13. The method, according to claim 12, wherein the third control layer controls the battery bank current by providing a reference DC voltage to the second control layer.

14. The method, according to claim 3, wherein the battery bank current controller modifies the reference DC voltage to change the current flowing from a storage system to the DC link of the secondary converter.

15. The method, according to claim 4, wherein a reference power injected into a power grid and the battery bank and a corresponding disturbance power on the primary converter, at a lower frequency than the rest of the four-layer cascade control, are calculated in order to meet a criterion of maximum rate of change of active power injected into the grid, wherein the reference power is a product between battery bank current and primary converter DC-link voltage.

16. The method, according to claim 15, wherein a reference battery bank power is calculated as a measured bank-supplied power plus a difference between the reference power injected into the grid and a measured grid injected power.

17. The method, according to claim 16, wherein an equation to calculate the reference battery bank power is calculated with at least one of the following equations: $P_{batref} = P_{bat} + P_{gref} - P_g$ or, ignoring losses, $P_{batref} = P_{gref} - P_{pv}$, wherein $P_{pv}$ is the power injected by a photovoltaic array.

18. The method, according to claim 17, wherein the reference power injected into the grid is calculated in order to guarantee a maximum rate of change, with an integral of a rate of change TV(t), which is limited in absolute value by the value desired by the operator: $\pm TV_{max}$.

19. The method, according to claim 18, wherein the maximum rate of change is calculated as a linear combination between the current power supplied by the battery bank and its deviation from a reference state of charge, but limited by the maximum rate of change value of the grid power.

20. The method, according to claim 19, wherein a calculation frequency of the reference power injected into the grid is lower than that of the maximum power point tracking system of the primary converter.

21. The method, according to claim 20, wherein the battery bank current is calculated by the equation: $I_{bat} = P_{dis}/V_{dc}$, wherein $I_{bat}$ variables is the battery bank current, $P_{dis}$ is the disturbance power on the primary converter, and $V_{dc}$ is the DC link voltage of the primary converter.

22. The method, according to claim 21, wherein the operation of the four control layers of the secondary converter are divided into two operating modes.

23. The method, according to claim 22, wherein the first operating mode has only layers one and two activated to load the DC link of the secondary converter at a voltage level given by the difference between the DC voltages of the storage system and the photovoltaic array.

24. The method, according to claim 23, wherein the secondary converter control activates a DC contactor by closing a circuit on a DC side of the system, electrically connecting the storage system and a photovoltaic power plant to the converter, after a first system initialization phase for smoothing photovoltaic power generation, when the DC voltage reaches the reference point.

25. The method, according to claim 24, wherein the system for smoothing photovoltaic power generation starts operating with the four control layers, making small variations around the operating point, around the DC voltage of the secondary converter, carrying out the power control of the storage system.

* * * * *